May 3, 1927.

C. C. FARMER

RESERVOIR DEVICE

Filed July 1, 1925

1,626,604

INVENTOR
CLYDE C. FARMER
BY Wm. M. Cady
ATTORNEY

Patented May 3, 1927.

1,626,604

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

RESERVOIR DEVICE.

Application filed July 1, 1925. Serial No. 40,801.

This invention relates to fluid pressure brakes and more particularly to a brake equipment having a reservoir associated therewith.

The various types of cars used in railroad service present different problems in the installation of fluid pressure brake apparatus and particularly reservoirs, since on ordinary freight cars it is desirable to suspend the reservoir underneath the car, while on dump cars this method of installation is impracticable and the reservoirs are usually mounted on a platform at the end of the car.

In order to ensure uniformity in action, the brake controlling valve device should be installed, so that the moving parts will always operate under the same gravitational conditions, and since there is provided a passage connecting the reservoir with the valve device, it has heretofore been necessary, in order to secure registration of the reservoir passage, to either provide different reservoirs having bolting lugs positioned for securing the reservoir in place when suspended or when mounted on a platform, or to employ two sets of bolting lugs on each reservoir, or to employ strap-hangers for holding the reservoir in place.

The principal object of my invention is to provide a construction such that the same reservoir may be employed regardless of whether the reservoir is suspended from the car or is mounted on a platform, and in which it is necessary to provide only one set of bolting lugs.

Figure 1:
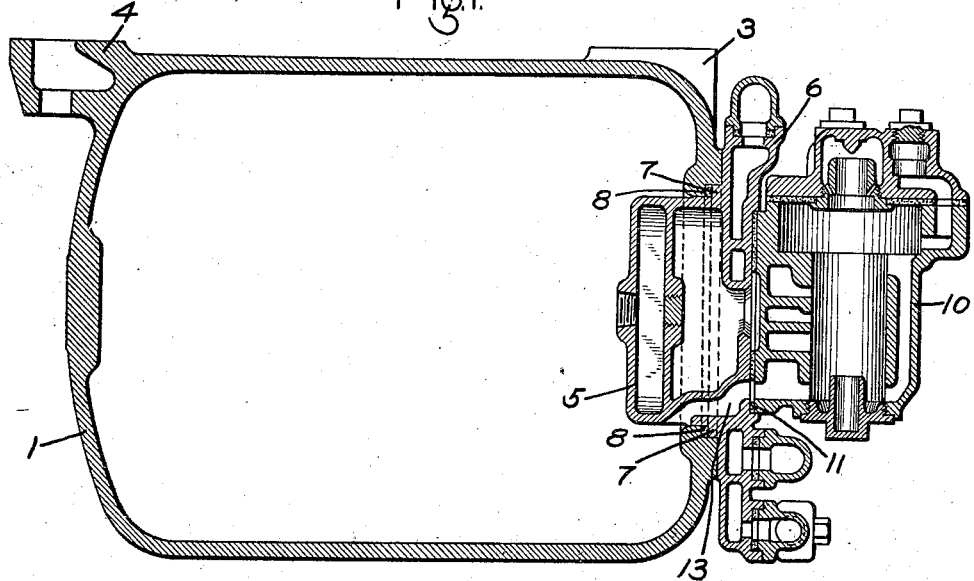
Figure 2:
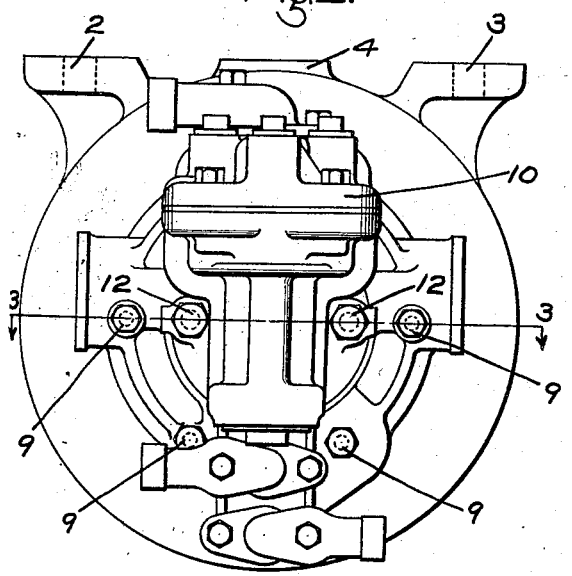
Figure 3:
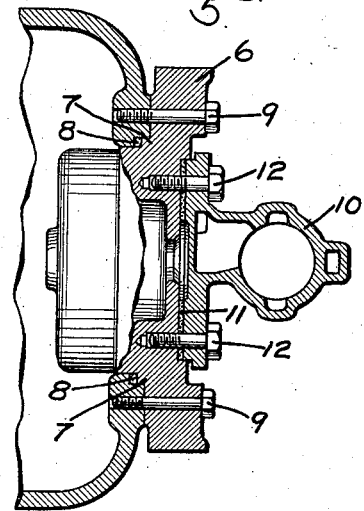

In the accompanying drawing; Fig. 1 is a sectional view of a brake controlling valve device and a reservoir connected thereto in accordance with my invention; Fig. 2 an end view of the construction shown in Fig. 1; and Fig. 3 a partial section on the line 3—3 of Fig. 2.

Referring to the drawing, the reference numeral 10 indicates the casing of a brake controlling valve device and the numeral 1 a reservoir associated therewith. Interposed between the reservoir 1 and the casing 10 is a combined pipe bracket and filling piece 6 having passages adapted to register with the usual passages (not shown) of the brake controlling valve device.

The filling piece 6 is provided with a projecting portion 5 containing one or more chambers adapted to be employed in connection with the brake controlling valve device and the reservoir 1 is provided with a central opening adapted to receive said projecting portion. At the juncture of the projecting portion 5 with the filling piece 6 is provided an integral seat ring 7, which is adapted to register with a corresponding recess or enlargement of the opening in the reservoir and interposed between the ring 7 and the bottom of the recess is a gasket 8, so as to provide a leak tight joint.

The filling piece 6 is secured to the reservoir 1 by means of a plurality of equally spaced cap screws 9, which extend through said filling piece and have screw-threaded engagement in the reservoir 1. A face on the filling piece 6 is provided for receiving the brake controlling valve casing 10, a gasket 11 being interposed between the valve casing and the filling piece to prevent leakage.

The casing 10 is secured to the filling piece 6 by means of two cap screws 12 having screw-threaded engagement in the filling piece and a passage 13 in the filling piece is adapted to establish communication between the reservoir 1 and the valve casing 10.

The reservoir 1 is provided with bolt lugs 2, 3, and 4, and when it is to be suspended underneath a car, said reservoir is fastened to the car, by means of said lugs, in the position shown in Fig. 1 of the drawing, the filling piece 6 and brake controlling valve device being secured thereto, in the manner hereinbefore described. If it is necessary to mount the reservoir on a platform or the like, the reservoir may be secured to the filling piece with the feet 2, 3, and 4 turned at an angle of 180° from the position shown in Fig. 1, so that the lugs may be bolted to the platform. Since the cap screws 9 are equally spaced apart, the filling piece 6 may be secured to the reservoir in this position, as well as in the position where the reservoir is suspended from the car body. It will also be noted that the passage 13 will always register with the reservoir 1 regardless of the rotative position of the reservoir.

Having now described my invention, what I claim as new and desire to secure by Letters Patent, is:—

1. In a fluid pressure brake, the combination with a brake controlling valve device, of a filling piece secured to said valve device and having a passage connected to said valve device and having an annular seating ring, and a reservoir engaging said ring and adapted to be rotated to different positions thereon and having communication with said passage.

2. In a fluid pressure brake, the combination with a brake controlling valve device, of a filling piece secured to said valve device and having an annular seating ring, a projecting portion extending from said ring and containing one or more chambers, and a reservoir having an opening for receiving said projecting portion and adapted to engage said seating ring.

In testimony whereof I have hereunto set my hand.

CLYDE C. FARMER.